US009306772B2

(12) United States Patent
Jerbi et al.

(10) Patent No.: US 9,306,772 B2
(45) Date of Patent: Apr. 5, 2016

(54) METHOD FOR CARRYING OUT INSTANT MESSAGING WITH PACKET SWITCHED DATA

(75) Inventors: Belhassen Jerbi, Kirchheim (DE); Josef Laumen, Hildesheim (DE); Andreas Schmidt, Braunschweig (DE); Markus Trauberg, Velchede (DE); Sabine Van Niekerk, Salzgitter (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 977 days.

(21) Appl. No.: 10/492,956

(22) PCT Filed: Oct. 14, 2002

(86) PCT No.: PCT/DE02/03893
§ 371 (c)(1),
(2), (4) Date: Apr. 19, 2004

(87) PCT Pub. No.: WO03/036995
PCT Pub. Date: May 1, 2003

(65) Prior Publication Data
US 2005/0025155 A1 Feb. 3, 2005

(30) Foreign Application Priority Data

Oct. 19, 2001 (DE) .................... 101 51 743

(51) Int. Cl.
*G06F 15/16* (2006.01)
*H04L 12/58* (2006.01)
(Continued)

(52) U.S. Cl.
CPC .............. *H04L 12/581* (2013.01); *H04L 51/04* (2013.01); *H04L 67/02* (2013.01); *H04L 67/04* (2013.01); *H04M 3/382* (2013.01); *H04M 3/5307* (2013.01); *H04W 4/12* (2013.01);
(Continued)

(58) Field of Classification Search
CPC .................................. H04L 12/56; H04J 3/24
USPC ......................... 709/206; 370/395.2
See application file for complete search history.

(56) References Cited

U.S. PATENT DOCUMENTS 4,616,359 A * 10/1986 Fontenot ....................... 370/230
6,466,544 B1 * 10/2002 Sen et al. ...................... 370/231
(Continued)

FOREIGN PATENT DOCUMENTS

EP     1 104 964      6/2001
WO     WO 99/05828    2/1999
(Continued)

OTHER PUBLICATIONS

"Multimedia Messaging Service for GPRS and UMTS", Jarkko Sevanto, Nokia Telecommunications, 1999.*
(Continued)

*Primary Examiner* — Jerry Dennison
(74) *Attorney, Agent, or Firm* — Slayden Grubert Beard PLLC

(57) ABSTRACT

A method is provided for the instant transfer of packet switched data corresponding to at least one data content type between at least two terminals connected to each other by a packet switched network. An information element which is specific to the at least one data content type is transmitted to each element of the network involved in the communication link when a communication link is set up between the at least two terminals.

11 Claims, 4 Drawing Sheets

(51) Int. Cl.

| | | |
|---|---|---|
| *H04M 3/38* | (2006.01) | |
| *H04M 3/53* | (2006.01) | |
| *H04W 4/12* | (2009.01) | |
| *H04W 12/06* | (2009.01) | |
| *H04W 4/00* | (2009.01) | |
| *H04W 8/18* | (2009.01) | |
| *H04W 28/16* | (2009.01) | |
| *H04W 76/02* | (2009.01) | |
| *H04L 29/08* | (2006.01) | |

(52) U.S. Cl.
CPC .......... *H04W 12/06* (2013.01); *H04L 12/5895* (2013.01); *H04L 67/14* (2013.01); *H04L 67/24* (2013.01); *H04L 69/329* (2013.01); *H04M 3/387* (2013.01); *H04W 4/00* (2013.01); *H04W 8/18* (2013.01); *H04W 28/16* (2013.01); *H04W 76/02* (2013.01)

(56) References Cited

U.S. PATENT DOCUMENTS

| | | | | |
|---|---|---|---|---|
| 6,466,571 | B1* | 10/2002 | Dynarski et al. | 370/352 |
| 6,687,252 | B1* | 2/2004 | Bertrand et al. | 370/401 |
| 6,987,779 | B1* | 1/2006 | Sevanto et al. | 370/469 |
| 7,177,904 | B1* | 2/2007 | Mathur et al. | 709/204 |
| 7,293,107 | B1* | 11/2007 | Hanson et al. | 709/245 |
| 7,532,613 | B1* | 5/2009 | Sen et al. | 370/352 |
| 7,764,773 | B2* | 7/2010 | Haumont | 379/114.17 |
| 7,802,011 | B2* | 9/2010 | Haumont | 709/238 |
| 7,944,813 | B1* | 5/2011 | Hurtta et al. | 370/218 |
| 2001/0028636 | A1* | 10/2001 | Skog et al. | 370/328 |
| 2001/0031635 | A1* | 10/2001 | Bharatia | 455/432 |
| 2001/0033563 | A1* | 10/2001 | Niemela et al. | 370/349 |
| 2002/0034935 | A1* | 3/2002 | Bjelland et al. | 455/403 |
| 2002/0045458 | A1* | 4/2002 | Parantainen et al. | 455/466 |
| 2002/0087707 | A1* | 7/2002 | Stewart et al. | 709/230 |
| 2002/0089949 | A1* | 7/2002 | Bjelland et al. | 370/331 |
| 2002/0120872 | A1* | 8/2002 | Amada et al. | 713/201 |
| 2002/0131395 | A1* | 9/2002 | Wang | 370/349 |
| 2002/0150092 | A1* | 10/2002 | Bontempi et al. | 370/389 |
| 2002/0164983 | A1* | 11/2002 | Raviv et al. | 455/432 |
| 2002/0184391 | A1* | 12/2002 | Phillips | 709/248 |
| 2002/0187789 | A1* | 12/2002 | Diachina et al. | 455/452 |
| 2002/0191556 | A1* | 12/2002 | Krishnarajah et al. | 370/329 |
| 2003/0063072 | A1* | 4/2003 | Brandenberg et al. | 345/173 |
| 2003/0118010 | A1* | 6/2003 | Ala-Luukko | 370/353 |
| 2005/0025155 | A1* | 2/2005 | Jerbi et al. | 370/395.2 |

FOREIGN PATENT DOCUMENTS

| | | |
|---|---|---|
| WO | WO 99/48310 | 9/1999 |
| WO | WO 00/64203 | 10/2000 |
| WO | WO 00/78080 | 12/2000 |
| WO | WO0120939 | 3/2001 |
| WO | WO 01/67622 | 9/2001 |
| WO | WO 01/76120 | 9/2001 |

OTHER PUBLICATIONS

"AOL buddies with mobile phone users via short message service", Peter Sayer, InfoWorld, Feb. 22, 2001.*

Fachbuch "Informationstechnik/Mobilfunknetze and ihre Protoholle" von B. Walke, 1998.

Sevanto, "Multimedia Messaging Service for GPRS and UMTS", Wireless Communications and Networking Conference, 1999, 1999 IEEE New Orleans, Sep. 21-24, 1999.

* cited by examiner

METHOD FOR CARRYING OUT INSTANT MESSAGING WITH PACKET SWITCHED DATA

BACKGROUND OF THE INVENTION

The present invention relates to a method for immediate transmission of data of at least one data content type between at least two terminals which are connected to one another via a network.

A method such as this, in the wide sense, is known for WO 00/78080 A1.

Instant or immediate messaging is already known on the Internet and is used, for example, for immediate transmission of message data from a mobile terminal to a further user, or to a closed user group. By way of example, the interchange of messages, the interchange of information about the availability of the called subscribers, the definition of user groups (chat rooms) and the joint use of files, which are stored in the network by a closed user group, may be mentioned as individual data content types. The four last-mentioned information services either may be combined to form a service for immediate transmission of data with a number of data content types, or each data content type is associated with a separate service.

The introduction of the service for immediate transmission of packet switched data, such as message data, is currently being discussed in the 3GPP and WAP Forum standardization committees. Specific solution options for implementation and, in particular, for charging for the service that is known from the Internet on third-generation mobile radio systems, such as UMTS ("Universal Mobile Telecommunications Standard") have not yet been worked out, however.

An object of the present invention is, thus, to provide a method for immediate transmission of packet switched data of at least one data content type between at least two terminals which are connected to one another via a packet switching network.

SUMMARY OF THE INVENTION

Such object is achieved by a method for immediate transmission of packet switched data of at least one data content type between at least two terminals which are connected to one another via a packet switching network, in which, when a communication link is set up between the at least two terminals, an information element which is specific for the at least one data content type is transmitted to each element of the network which is involved in the communication link.

One major feature of the present invention is that the purpose of the intended data transmission is signaled to each element of the network which is involved in the communication link between, for example, two terminals. This results in the advantage that each involved element in the network can handle data packets which are associated with immediate transmission of data in a specific manner. At the same time, the method assists in the maintenance (which is becoming ever more important) of the transmission of, for example, message data for so-called roaming; that is to say, transmission between different mobile radio networks of different network operators. In general, the inventive method makes it possible to carry out administration which is specific for the data content type, or to process data packets, this also including, in particular, charging.

In one embodiment of the present invention, the packet switching network is equipped with the "General Packet Radio Service" (GPRS), and has the network elements "Gateway GPRS Support Node" (GGSN) and "Serving GPRS Support Node" (SGSN).

The GPRS service, particularly its logical architecture, mobility administration and protocol architecture, is described in the textbook "Informationstechnik/Mobilfunknetze und ihre Protokolle", [Information Technology/Mobile Radio Networks and Their Protocols] by B. Walke, B. G. Teubner, Stuttgart 1998. If GPRS is used, two major network elements which are involved in a communication link are SGSN and the GGSN, between which encapsulated data packets and signaling information that occurs is transmitted with the aid of a tunnel protocol, the "GPRS Tunnel Protocol" (GTP). The signaling information which occurs includes information elements, one of which, according to the present invention, signals (in the case of the present embodiment) to the GGSN and the SGSN that the communication link is being used for immediate transmission of packet switched data.

The information element preferably is an end user address information element, which includes a PDP type number which is specific for the at least one data content type and which defines the packet data protocol (PDP) type. As soon as a mobile station has registered in the packet data service GPRS, one or more PDP contexts for the new end user address information element can be handled by the SGSN, including a PDP type number that is specific for immediate transmission of data.

Various alternatives are possible for the type of content of the packet switched data. The data may contain messages, information about the availability of the users of the at least two terminals, information about at least one associated group of users of the terminals, and information about the capability for joint use of at least one file, which is stored in the network, by at least one associated group of users of the terminals. Data content type combinations are also possible.

If two or more data content types are provided, each data content type preferably is associated with a different information element so that, in a situation where the information element is an end user address information element, two or more end user address information elements are provided, and differ by each having PDP type numbers.

Additional features and advantages of the present invention are described in, and will be apparent from, the following Detailed Description of the Invention and the Figures.

DETAILED DESCRIPTION OF THE INVENTION

Figure 6:
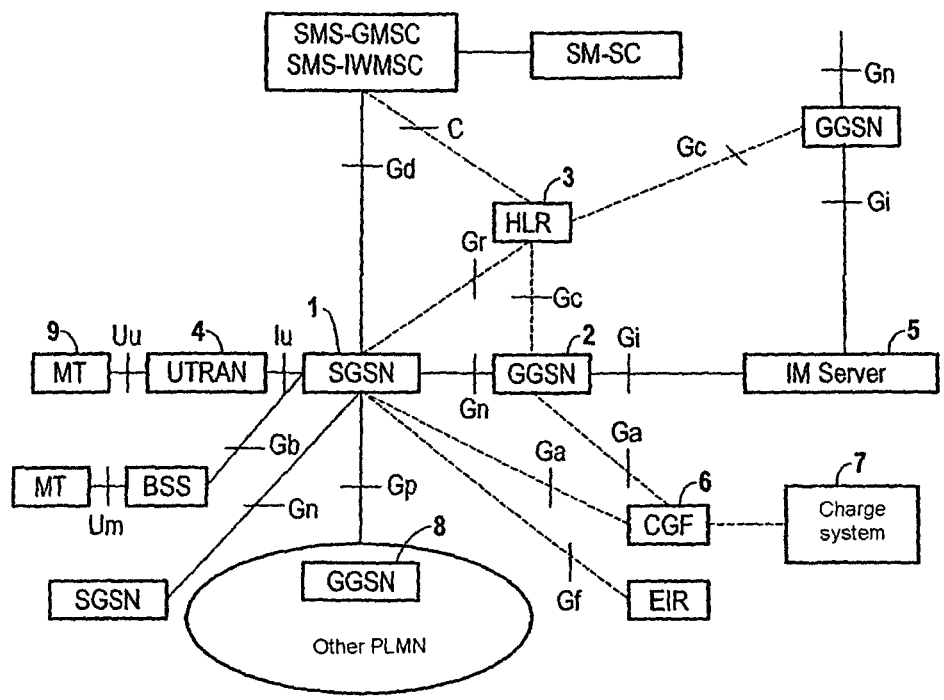
FIG. 6 shows a network overview for packet switched data services with a link to a server.

FIG. 6 shows an overview of a packet switching network of a "General Packet Radio Service" (GPRS) or of a "Universal Mobile Telecommunications System" (UMTS). A dotted line in FIG. 6 denotes a signaling interface, while a solid line indicates a signaling and data transfer interface. This also applies to FIGS. 7 to 9. A first network element SGSN 1 is used for evaluation of the packet data protocol addresses. The data packets are encapsulated and are sent to a second network element GGSN 2, which itself initiates the process of passing them on to a packet data network (PDN).

The first network element SGSN 1 is used for functional support for the mobile station MT. In this case, for example, the addresses of the subscribers of a group call are obtained from a third network element HLR 3.

The mobile telephone MT 9 is connected via a terrestrial radio access network for UMTS UTRAN 4 to the first network element SGSN 1 using two intermediate interfaces Iu and Uu. The second network element GGSN 2 is linked to the first network element SGSN 1 via an interface Gn. The second network element GGSN 2 is also connected via an interface Gi to a server 5 for immediate transmission of message data (IM server), via which message data can be interchanged between two different users of the network in real time.

The second network element GGSN 2 is connected via an interface Ga to a charging device CGF 6, which receives information about services that are being used both from the first network element SGSN 1 and from the second network element GGSN 2, and passes such information on to a charge billing system 7. The interfaces Ga are associated with the last described function.

The first network element SGSN 1 is also connected via an interface Gp to an element 8 outside the network, as is indicated in FIG. 6 by GGSN for another PLMN.

When a communication link is being set up, a so-called tunnel protocol, the GPRS Tunnel Protocol GTP, is carried out, during which information elements which relate to the progress of the connection are passed to the network elements which are involved in a communication link, such as the first and second network elements SGSN 1, GGSN 2, with the necessary settings between the network elements that are involved being made via suitable protocols for the communication link.

Figure 1:
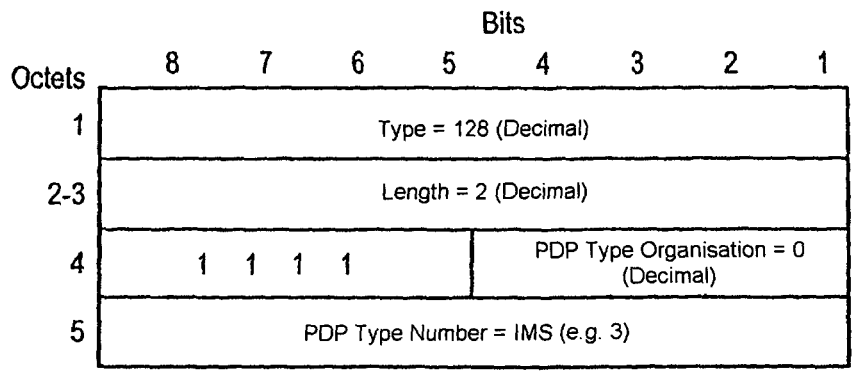
FIG. 1 shows a schematic illustration of an end user address information element.
Figure 2:
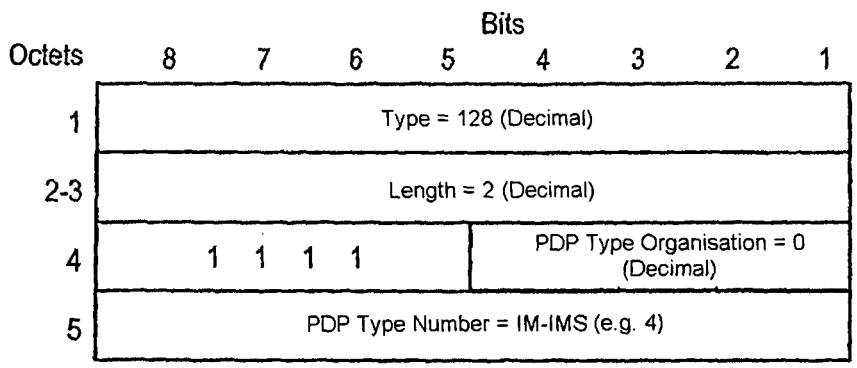
FIGS. 2, 3, 4, 5 each show schematic illustrations of end user address information elements for different services with immediate transmission of data.
Figure 3:
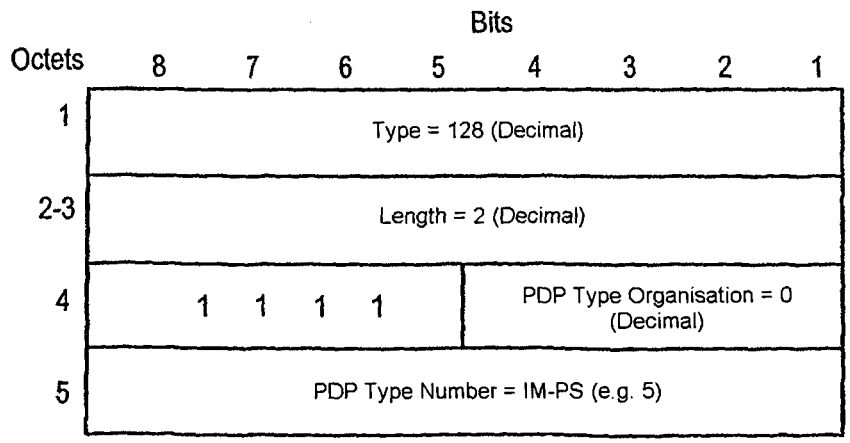
Figure 4:
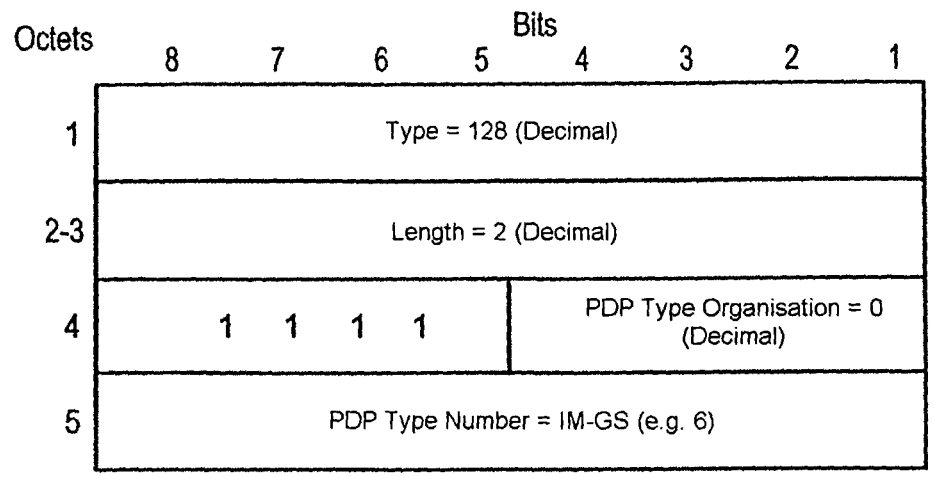
Figure 5:
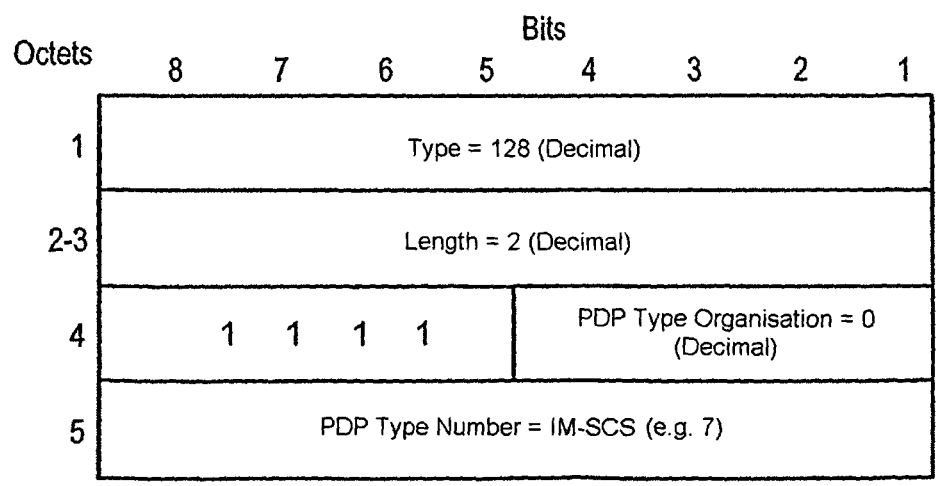

One of these functional elements contains the information that data packets to be transmitted are associated with a service for immediate messaging (instant messaging). FIG. 1 shows such an information element which contains a packet data protocol type number (PDP type number), which is specific for instant messaging and is annotated IMS in FIG. 1. By way of example, the number 3 is indicated as the type number in FIG. 1. The information element that is illustrated in FIG. 1 is an end user address information element, with the end user address being handled via a PPP (Point-to-Point Protocol) in the same way as with the known PDP types PPP.

In a packet switching core network of a mobile radio system, that is to say in the first network element SGSN 1 and in the second network element GGSN 2, the form of the end user address information element allows specific handling for instant messaging of packet switched data. For this purpose, instant messaging is, by way of example, associated with specific charging models, special handling of data packets which are associated with instant messaging, in overload situations, specific routing for instant messaging data packets within the core network, or the setting up of a PPP/IP link for instant messaging data packets via the interface Gi from the second network element GGSN 2 to the IM server 5, whose IP address is determined via the end user address for instant messaging.

Since the setting up of the proposed PDP type IMS does not directly contain any end user address for instant messaging, it must be predetermined or defined using other methods. This will be explained later.

FIGS. 2 to 5 relate to alternative configurations of end user address information elements for the situation where instant messaging is split into four service elements.

The individually illustrated configurations each differ by their respective PDP type number. In this case, IM-MS (4) represents a message switching instant data service, IM-PS (5) represents a presence service in which information, such as that about the availability of network subscribers, can be interchanged in real time and via the network, IM-GS (6) represents a group service in which, for example, a message from a network subscriber is transmitted to a predetermined number of other network subscribers and/or discussions are held between network subscribers by the transmission of messages, and IM-SCS (7) relates to a service for joint use of the contents of an instant messaging service which may be linked to an actual message transmission service.

The new PDP types defined in this way for the end user address information element are used, in particular, to provide the network elements SGSN 1 and GGSN 2 in the core network of the mobile radio system with the capability to allow an activated PDP context of the IMS type or, alternatively, IM-MS, IM-PS, IM-GS or IM-SCS to be used exclusively for the respectively associated service, as described above. As such, a PDP context for the newly defined PDP types cannot be used for a link to any desired Internet service provider (ISP), but is associated with a selected service.

Figure 7:
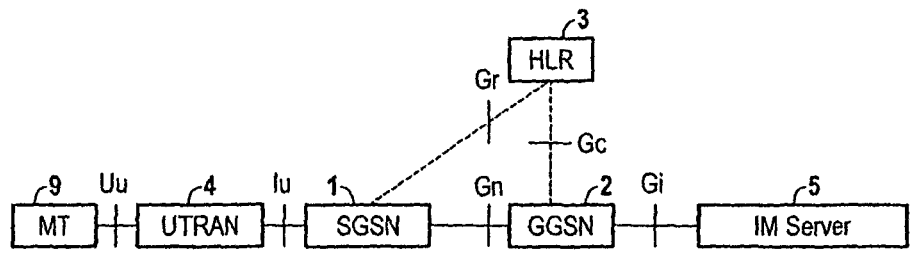
FIG. 7 shows a schematic illustration of a network for transmission of a server IP address for immediate transmission of data from a mobile telephone to the GGSN.
Figure 8:
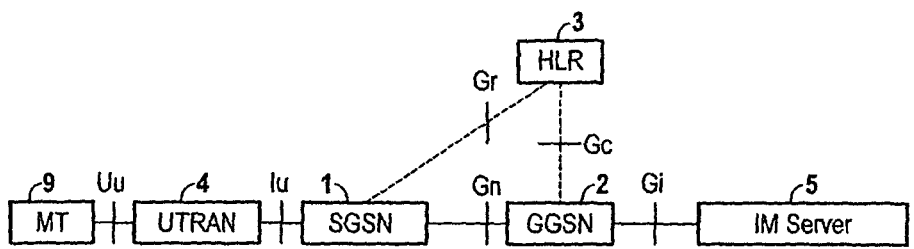
FIG. 8 shows a schematic illustration of an alternative embodiment for transmission of a server IP address.
Figure 9:
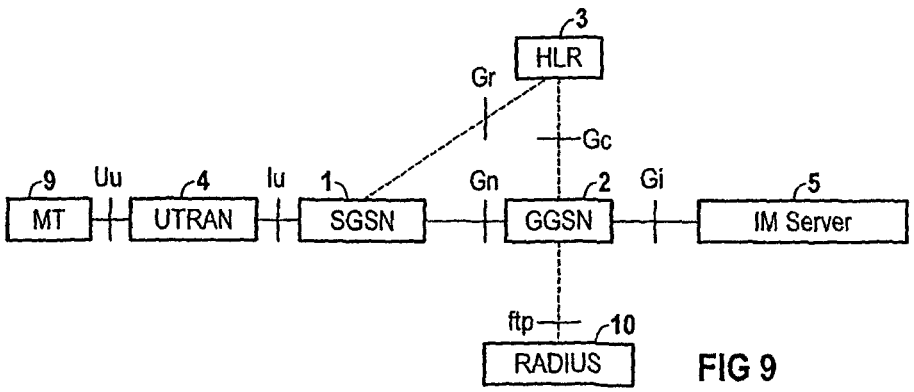
FIG. 9 shows a schematic illustration of a further embodiment for transmission of a server IP address from a RADIUS to the GGSN.

The following text discusses alternative ways in which the end user address of the mobile telephone MT can be defined, particularly with reference to FIGS. 7, 8 and 9.

In the first embodiment shown in FIG. 7, an end user address for instant messaging is transmitted from the mobile telephone MT 9 during a PDP context activation via the UTRAN 4 to the packet switching network elements SGSN 1 and GGSN 2. The GGSN 2 can now use this end user address for instant messaging to set up a link to the IM server 5.

The end user address for instant messaging either can be freely configured by the user in the mobile telephone MT 9, or may be stored on a USIM card ("Universal Subscriber Identity Module") by the network operator. Fixed presetting of the end user address for instant messaging on the USIM admittedly restricts the user of the mobile telephone in the choice of alternative service providers for instant messaging. At the same time, however, it saves the user tedious configuration of end user addresses for instant messaging. Furthermore, the fixed presetting of an end user address for instant messaging is invariably desirable from the point of view of a service provider for instant messaging, as it provides the capability to prevent the involvement of competing service providers for instant messaging.

In a second embodiment as shown in FIG. 8, an end user address for instant messaging is transmitted during a check of the subscription information (see 3 GPP TS 29.002) from the network element HLR 3 to the first network element SGSN 1. The end user address can be transmitted from the network element SGSN 1 to the network element GGSN 2 during PDP context activation. The network element GGSN 2 can now set up a link to the IM server 5 using this end user address for instant messaging. The advantage of this embodiment is that the network operator can change or update the end user address for instant messaging at any time.

FIG. 9 shows a third embodiment for definition of the end user address for instant messaging. This assumes that the network element GGSN 2 has received an invalid end user address for instant messaging, such as via the UTRAN 4, or after a check of the subscription of the network element HLR 3, which is not supported by the network element GGSN 2. In this case, the network element GGSN 2 can start a check to a radius service 10 ("Remote Access Dial In User Service") which provides an end user address for instant messaging for the instant messaging data packets to be transported. The network element GGSN 2 can now set up a link to the IM server 5 using such end user address for instant messaging. One advantage of this embodiment for definition of the end user address for instant messaging is that the network operator or the service provider for instant messaging can change or update the end user address for instant messaging at any time.

It must be emphasized that the procedures described with reference to FIGS. 7 to 9 for definition of the end user address for instant messaging can be used analogously for an instant messaging service which includes the four service elements mentioned above.

Indeed, although the present invention has been described with reference to specific embodiments, those of skill in the art will recognize that changes may be made thereto without departing from the spirit and scope of the present invention as set forth in the hereafter appended claims.

The invention claimed is:

1. A method for providing a service, the method comprising:
    setting up a communication connection between a terminal and a server providing a service, wherein said communication connection is set up via a packet switched network to which the terminal is connected, wherein setting up the communication connection comprises:
        sending from the terminal a signaling message comprising an information element comprising a Packet Data Protocol (PDP) type number, the information element indicating (a) the service for a requested communication connection to be set up, wherein the service is associated with the PDP type number, and (b) a terminal address to be used for setting up the requested communication connection for the service, wherein the terminal address is associated with the PDP type number but the information element does not contain the terminal address;
        receiving the signaling message by the packet switched network; and
        determining by the packet switched network, based on the service indicated in the signaling message and a check of the terminal's subscription, whether the terminal address indicated by the signaling message is a valid address for said service; and
        in response to the packet switched network determining that the terminal address is a valid address for said service, identifying based on the terminal address a server that provides said service and setting up a communication link to said identified server for providing the requested communication connection, thereby ensuring that the communication connection is set up with a server that provides said service.

2. A method for providing a service as claimed in claim 1, wherein the packet switched network is equipped with one of GPRS and UMTS, and includes network elements Gateway GPRS Support Node and Serving GPRS Support Node.

3. A method for providing a service as claimed in claim 1, wherein said indicated service transmitted by said information element comprises a plurality of elements of an instant messaging service, including at least a messaging service, a presence service, a group service, and a service for joint use.

4. A method for providing a service as claimed in claim 1, wherein said indicated service transmitted by said particular information element comprises at least a messaging service, a presence service, a group service, and a service for joint use.

5. A method for providing a service as claimed in claim 4, wherein said services are services for immediate messaging.

6. A method for providing a service as claimed in claim 1, further comprising
    indicating to the packet switched network, via the signaling message, an address of the server to which the communication connection is to be set up.

7. A method for providing a service as claimed in claim 6, further comprising
    providing the address of the server by the terminal.

8. A method for providing a service as claimed in claim 6, further comprising
    determining the address of the server by a network element of the packet switched network.

9. A method for providing a service as claimed in claim 6, further comprising
    using a particular information element in the signaling message to transmit both the requested service and the address of the server.

10. A method for providing a service as claimed in claim 9, further comprising
    using the end user address information element as the particular information element in the signaling message to transmit both the requested service and the address of the server.

11. A method for providing a service as claimed in claim 1, further comprising
    using, by packet switched network, said indication to perform a handling that is particular for the indicated service.

* * * * *